AMPLIFYING ARRANGEMENT HAVING TWO TRANSISTORS

Filed June 21, 1965

INVENTOR.

EDMOND DE NIET
BY
Frank R. Jufani
AGENT 3,384,830
Patented May 21, 1968

3,384,830

AMPLIFYING ARRANGEMENT HAVING TWO TRANSISTORS

Edmond de Niet, Emmasingel, Eindhoven, Netherlands, assignor to North American Philips Company, Inc., New York, N.Y., a corporation of Delaware Filed June 21, 1965, Ser. No. 465,285
Claims priority, application Netherlands, June 20, 1964, 64—7,073
12 Claims. (Cl. 330—18)

This invention relates to amplifying arrangements having two transistors the emitter-collector circuits of which are connected to the supply voltage in series with a diode included between the collector of the first transistor and the emitter of the second transistor, a control signal being applied to the base of the first transistor, a load being connected to the emitter of the second transistor, and the collector of the first transistor together with the base of the second transistor being connected to one end of a common resistor.

Such circuits are used, for example, for amplifying electrical signals in push pull using an output with a transformer (single-ended push pull). They may also be used, however, as control circuits for electric motors or relays in which the current or the reversal of current through a load plays an essential part. In such circuits the conversion of direct-voltage energy of the supply into low-frequency energy of the signal with maximum efficiency is concerned.

More particularly the two transistors can be used in their non-linear working region, that is to say as switches since the losses in the transistor when switched-on are very low (class-D amplifier PIEE April 1965 p. 423). In known circuits a diode is connected in series with the two transistors in order to make the no-load currents through the transistors completely different from each other and thus maintain the total consumption of current as low as possible. The said diode also serves to avoid that a condition may arise in which both transistors in series are conducting for short moments simultaneously. The dangerous short-circuit of the supply is thus no longer possible since the condition of the second transistor is completely prescribed by the condition of the first transistor. A disadvantage of this circuit is the energy losses occurring. In fact, if the first transistor is cut-off, it is necessary for the total drive of the second transistor that the base-emitter voltage is more negative than the collector-emitter voltage. To this end, the aforementioned common resistor must be connected to a point on the supply source which has a negative voltage higher than the voltage at the collector of the said transistor. Also, the common resistor must be low-ohmic enough to obtain the base current, required for this drive. In the cut-off condition of the second transistor a signal current flows through the common resistor which is provided by the first transistor. In known circuits the current flowing through said resistor results in a considerable decrease in efficiency. The object of the invention is to provide an arrangement in which the correct bias potentials at the base of the second transistor and at the collector of the first transistor or at the diode are obtained through the common resistor in a manner such that a higher efficiency results.

The invention is characterized in that the other end of the common resistor is connected to a rectifying circuit comprising a capacitor and a second diode and connected to the load circuit.

In order that the invention may readily be carried into effect, it will now be described in detail, by way of example, with reference to the accompanying diagrammatic drawing, in which.

Figure 1:
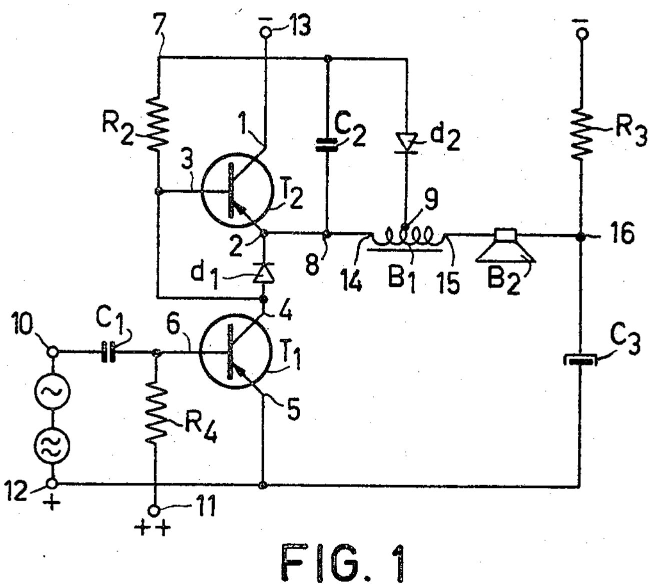
FIG. 1 shows a first embodiment in accordance with the invention.

The control signals are applied through a separating capacitor $C_1$ to a base 6 of a transistor $T_1$ having an emitter 5 which is connected to a terminal 12 of a supply voltage source and a collector 4 which is connected to one electrode of a diode $d_1$. The other electrode of the diode $d_1$ is connected to an emitter 2 of a transistor $T_2$ the collector of which is connected to a terminal 13 of the supply voltage source. A base 3 of transistor $T_2$ and the collector 4 of transistor $T_1$ are connected to the one end of a resistor $R_2$.

A load circuit which includes $B_1$ and $B_2$ as the load is connected, in series with an uncoupling capacitor $C_3$, between the emitter 2 of transistor $T_2$ and the emitter 5 of transistor $T_1$.

The end 7 of resistor $R_2$ is connected to a rectifying circuit comprising a capacitor $C_2$ and a diode $d_2$ the ends 8 and 9 of which are connected to the load circuit.

The base 6 of transistor $T_1$ is connected through a resistor $R_4$ via a terminal 11 to the supply voltage so that the base of transistor $T_1$, in the absence of a signal, is invariably cut-off relative to the emitter of transistor $T_1$. The transistors $T_1$ and $T_2$ are junction transistors of the same conductivity type, in this example of the pnp-type.

The circuit operates as follows:

In FIG. 1 an alternating voltage comprising a superposition of high-frequency and low-frequency components is applied to the base of the first transistor. The low-frequency components must be given off to the load. The positive and negative peaks of the alternating voltage drive the first transistor $T_1$ which is thus alternately cut-off and conducting. The state of conduction of the first transistor $T_1$ determines through the diode $d_1$ the state of conduction of the second transistor $T_2$. The transistor $T_2$ is conducting if transistor $T_1$ is cut-off and conversely. Thus, either the positive terminal 12 or the negative terminal 13 of the supply voltage source is connected to the load circuit. The direction of the current flowing through the load is thus determined by the polarity of the control signals appearing at the base of the first transistor $T_1$.

Assuming that the transistor $T_1$ is conducting, the current flows from the positive terminal 12 of the supply voltage source through the said transistor and the diode $d_1$, which is also conducting, to the load if the capacitor $C_3$ has a sufficient negative charge. The capacitor $C_3$ possesses this charge from the previous condition of the arrangement in which the current flows in the opposite direction. To ensure that the capacitor $C_3$ is also charged when the arrangement is put into operation, the said capacitor is connected through a high-value resistor $R_3$ to the negative side of the supply source.

In this conducting state of transistor $T_1$ the voltage at the base of the second transistor $T_2$, due to the voltage drop across the conducting diode $d_1$, is positive relative to the emitter of transistor $T_2$ so that this transistor is cut-off. The current flowing from the collector of transistor $T_1$ through the resistor $R_2$ also reaches through the diode $d_2$ the load circuit. Consequently there is no loss of current through the resistor $R_2$ in contrast with known circuits in which the resistor $R_2$ is connected to a negative terminal of the supply source.

The capacitor $C_2$ of the rectifying circuit is negatively charged in this condition at the side 7 of resistor $R_2$.

The conversion of the supply source energy into low-frequency energy in this condition of the circuit is effected with high efficiency.

If the transistor $T_1$ is now cut-off the diode $d_1$ is also cut-off since at this instant the voltage at the emitter of said diode is determined by the negative voltage offered through the resistor $R_2$. This voltage is the negative rectifying voltage from the rectifying circuit connected to the load circuit and comprising the capacitor $C_2$ and the diode $d_2$.

The high-frequency components present in the control signal provides a high-frequency voltage in the load circuit through the load or part thereof, the negative peaks of said high-frequency voltage being rectified by the rectifying circuit connected to the load circuit. The voltage appearing at the end 7 of the common resistor is then determined by the said negative rectified voltage and the negative voltage which was still present on the capacitor. By suitable choice of the posisition of the connection of the rectifying circuit to the load circuit and the value of resistor $R_2$, said negative voltage may be given a value such that the voltage at the base-emitter junction of the second transistor $T_2$ is so much more negative than the voltage between its collector and emitter that the said transistor is driven into saturation. Due to this voltage, the diode $d_1$ is thus cut-off in this condition. Consequently, the current flows from the side 16 of capacitor $C_3$, which is now charged positively, through the load and directly through the conducting transistor $T_2$ to the negative terminal 13 of the supply source. The currents now flow through the load in a direction opposite to that described above.

Since in this case the desired voltage at the base of the transistor $T_2$ and also the cut-off voltage for the diode $d_1$ are provided by the high-frequency components present in the signal, the conversion of the supply source energy into the low-frequency energy is again effected with high efficiency.

In the load circuit the load $B_1$, $B_2$, for example, a loudspeaker, may be imagined to be divided into a resistor $B_2$ and a coil $B_1$. If the high-frequency component has a sufficiently high frequency this coil already suffices as a high-frequency choke together with the charge present on $C_2$, to give off the desired negative voltage through the rectifying circuit to the base of transistor $T_2$ and the emitter of diode $d_1$ or the collector of transistor $T_1$.

Figure 2:
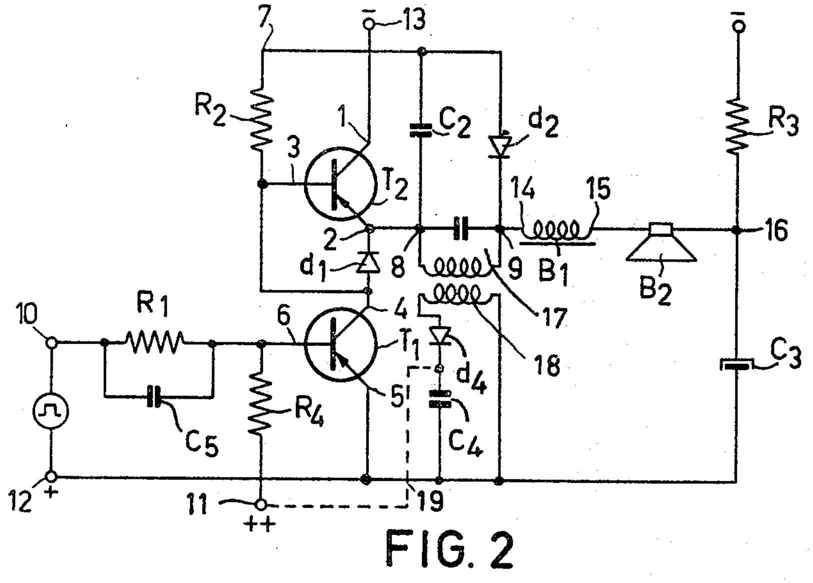
FIG. 2 shows a second embodiment in accordance with the invention.

In the case of a class-D amplifier (FIG. 2) the control signals are pulsatory and the low-frequency component is supplied as a pulse-width modulation. These pulses are applied to the base of transistor $T_1$ through a differentiating network comprising the parallel combination of a resistor $R_1$ and a capacitor $C_5$ so that the moments of switching the transistors $T_1$ and $T_2$ into the conducting and cut-off conditions are clearly determined.

The fundamental wave of the pulses being offered may be applied from an oscillatory circuit 17, which is tuned to this fundamental wave and connected in series with the load, to the rectifying circuit comprising the capacitor $C_2$ and the diode $d_2$ resulting in the required voltage for the base of transistor $T_2$ and the anode of diode $d_1$ or the collector of transistor $T_1$. In the above-mentioned circuits the high-frequency energy in the load circuit may lastly be used to provide the positive voltage on the terminal 11 for the base voltage of the first transistor $T_1$.

To this end a coupling winding 8 may be arranged near the choke coil $B_1$ or the oscillatory circuit 17 (see FIG. 2) whereafter the voltage for the terminal 11 is derived through a lead 19 from a rectifying circuit comprising a diode $d_4$ and a capacitor $C_4$ in series with the said winding. The supply source need not then provide an additional positive voltage higher than that given off to the terminal 12.

What I claim is:

1. An amplifying arrangement having two transistors the emitter-collector circuits of which are connected to the supply voltage in series with a diode included between the collector of the first transistor and the emitter of the second transistor, a control signal being applied to the base of the first transistor, a load being connected to the emitter of the second transistor, and the collector of the first transistor together with the base of the second transistor being connected to one end of a common resistor, characterized in that the other end of the common resistor is connected to a rectifying circuit comprising a capacitor and a second diode and connected to the load circuit.

2. An amplifying arrangement as claimed in claim 1, characterized in that the control signal at the base of the first transistor comprises high-frequency and low-frequency components.

3. An amplifying arrangement as claimed in claim 1, characterized in that the arrangement is a class-D amplifier.

4. An amplifying arrangement as claimed in claim 1, characterized in that the rectifying circuit comprising the capacitor and the second diode is connected to a high-frequency choke in the load circuit.

5. An amplifying arrangement as claimed in claim 1, characterized in that the rectifying circuit is connected to a tuned circuit included in the load circuit.

6. An amplfying arrangement as claimed in claim 5, characterized in that the base voltage of the first transistor is provided by high-frequency components of said tuned circuit by means of a further rectifying circuit inductively coupled to said tuned circuit.

7. A transistor amplifier comprising first and second transistors, a source of operating voltage having first and second terminals, first diode means, means connecting the emitter-collector path of said first transistor, said first diode, and the emitter-collector path of said second transistor between said first and second terminals in that order, the emitter-collector paths of said transistors and said diode being poled for current flow in the same direction, a source of signals connected to the base of said first transistor, output circuit means connected to the emitter of said second transistor, resistor means having one end connected to the base of said second transistor and the collector of said first transistor, second diode means and capacitor means each having one end connected to the other end of said resistor means, and means connecting the other ends of said second diode means and capacitor means to said output circuit means.

8. A transistor amplifier comprising first and second transistors, a source of operating voltage having a first terminal connected to the emitter of said first transistor and a second terminal connected to the collector of said second transistor, a source of signals connected to the base of said first transistor, diode means connected between the collector of said first transistor and the emitter of said second transistor, resistor means having one end connected to the collector of said first transistor and the base of said second transistor, output circuit means connected to the emitter of said second transistor, capacitor and second diode means each having one end connected to the other end of said resistor means, and means connecting the other ends of said capacitor and second diode means to said output circuit means, whereby when said first transistor conducts said second transistor is cutoff and collector current of said first transistor flows in a first path through said first diode means and in one direction through said output circuit means and in a second path through said resistor means and second diode means and through at least a part of said output circuit means in said one direction, and when said first transistor is cutoff said second transistor conducts current in the other direction through said output circuit means.

9. A transistor amplifier comprising first and second transistors, a source of operating voltage having a first terminal connected to the emitter of said first transistor and a second terminal connected to the collector of said second transistor, a source of signals connected to the base of said first transistor, diode means connected between the collector of said first transistor and the emitter of said second transistor, resistor means having one end connected to the collector of said first transistor and the base of said second transistor, second diode means and capacitor means each having one end connected to the other end of said resistor means, means connecting the other end of said capacitor means to the emitter of said second transistor, inductive output circuit means, means connecting said output circuit means to the emitter of said second transistor, and means connecting the other end of said second diode means to said output circuit means, whereby when said first transistor conducts said second transistor is cutoff and collector current of said first transistor flows in a first path through said first diode means and in one direction through said output circuit means and in a second path through said resistor means and second diode means and through at least a part of said output circuit means in said one direction, and when said first transistor is cutoff said second transistor conducts current in the opposite direction through said output circuit means.

10. The transistor amplifier of claim 9, comprising a capacitor having one electrode connected to said first terminal, wherein said output circuit means comprises a tapped inductor and speaker means serially connected in that order between the emitter of said second transistor and the other electrode of said capacitor, said other end of said second diode means being connected to a tap on said inductor.

11. The transistor amplifier of claim 9, comprising a capacitor having one electrode connected to said first terminal, wherein said output circuit means comprises a resonant circuit, an inductor and speaker means connected in that order between the emitter of said second transistor and the second electrode of said capacitor, the other end of said second diode means being connected to the junction of said inductor and said resonant circuit.

12. The transistor amplifier of claim 11, comprising coil means inductively coupled to said resonant circuit, and rectifier means connected to said coil means, and means connecting said rectifier means to the base electrode of said first transistor for supplying base bias therefor.

References Cited

UNITED STATES PATENTS 3,271,590 9/1966 Sturman ---------- 330—18 XR

ROY LAKE, *Primary Examiner.*

E. C. FOLSOM, *Assistant Examiner.*